Feb. 23, 1932. G. A. ROBERDS 1,846,224
CYCLE PROPELLING APPARATUS
Filed June 21, 1930
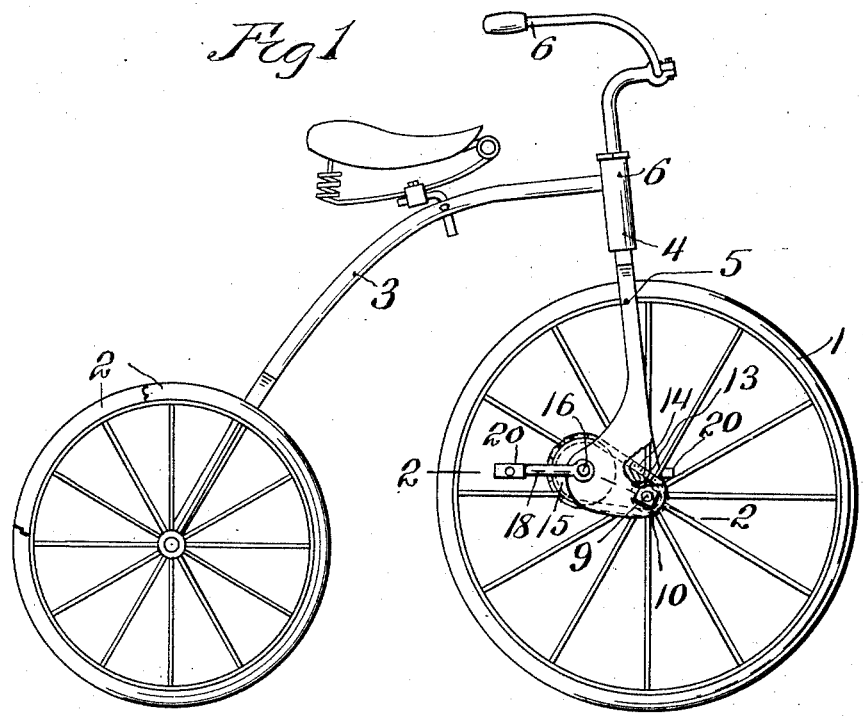
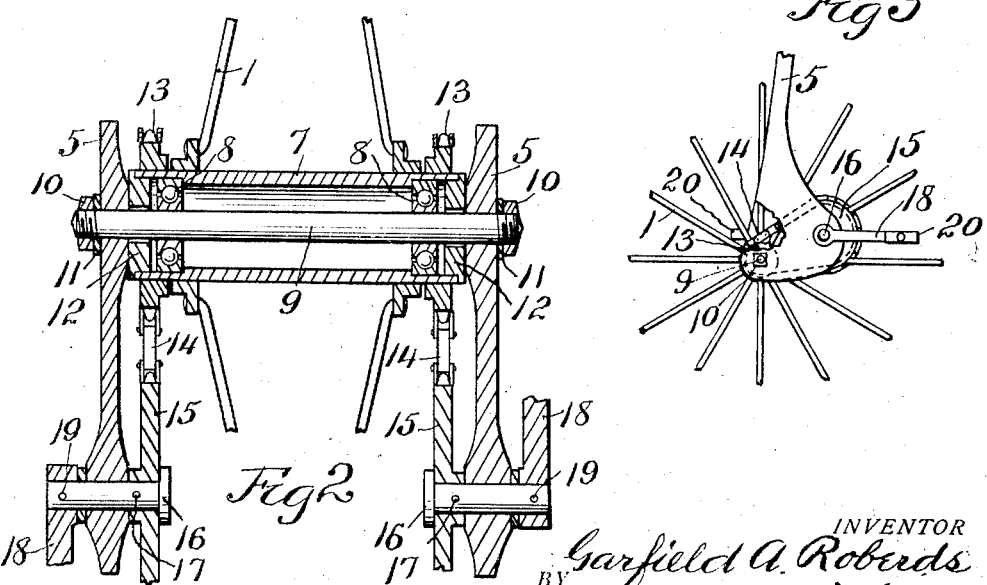
Witness
C. W. Olson
INVENTOR
Garfield A. Roberds
BY Warren D. House
His ATTORNEY Patented Feb. 23, 1932

1,846,224

UNITED STATES PATENT OFFICE

GARFIELD A. ROBERDS, OF OLATHE, KANSAS, ASSIGNOR OF ONE-HALF TO JOSEPH FELDMAN, OF OLATHE, KANSAS

CYCLE PROPELLING APPARATUS

Application filed June 21, 1930. Serial No. 462,864.

My invention relates to improvements in cycle propelling apparatus.

The object of my invention is to provide a novel cycle propelling apparatus which is simple, cheap to make, strong, durable, not likely to get out of order, which is easily operated, and which is readily adaptable to cycles of usual type, unicycles, bicycles, tricycles and motor cycles.

My invention further provides propelling mechanism which is all mounted on the steering fork, yet obtains a multiplication of speed in the driving carrying wheel over the pedal or otherwise actuated driving member.

The novel features of my invention are hereinafter fully described and claimed.

In the accompanying drawings, which illustrates the preferred embodiment of my invention as applied to a tricycle, Fig. 1 is a side elevation, partly broken away, of my improved apparatus as applied to a tricycle.

Fig. 2 is an enlarged section, partly broken away, on the line 2—2 of Fig. 1.

Fig. 3 is a side elevation, partly broken away looking at the left side of the propelling apparatus.

Similar characters of reference designate similar parts in the different views.

1 designates the front carrying wheel of a tricycle of usual type, 2 the rear carrying wheels, 3 the frame having the usual steering post 4, steering fork 5 and handle bars 6.

The carrying wheel 1 has a tubular hub 7 disposed between the arms of the fork 5, and containing two ball bearings 8, of usual type the inner races of which are mounted on a horizontal stationary axle comprising a rod 9 which extends through the hub 7 and through the arms of the fork 5.

The projecting ends of the rod 9 are threaded and having fitted on them nuts 10 which bear against collars 11, which in turn bear respectively against the outer sides of the arms of the fork 5.

On the rod 9 and respectively closing the ends of the hub 7 are two collars 12.

Two driven sprocket wheels 13 are mounted on and are revoluble with the hub 7, and are respectively connected by two chain belts 14 with two larger driving sprocket wheels 15 which are respectively mounted on and rotatable with two shafts 16, which are respectively rotatable in the arms of the fork 5.

Two removable pins 17 respectively fasten the sprocket wheels 15 to the shafts 16.

Two usual pedal cranks 18 are respectively mounted on the shafts 16 to which they are respectively fastened removably by pins 19, also removable. The pedal cranks carry the usual pedals 20 respectively.

Upon revolving the pedal cranks 18 in the usual manner, the wheel 1 will be forwardly driven through the intermediacy of the shafts 16, sprocket wheels 15 and 13, sprocket chains 14 and the hub 7.

The wheels 15 being larger than the wheels 13 a multiplication in speed is obtained in the carrying wheel 1 relative to the speed of rotation of the pedal cranks 18.

Should a fork arm 5 become bent, or should other repairs be needed, the carrying wheel, together with the driven wheels 13, the ball bearings 8 and the collars 12, can be bodily removed as a unit upon removing one of the nuts 10 and withdrawing the axle 9. After the repairs have been made, the carrying wheel with the parts carried thereby may be quickly restored as a unit to their operative position, thus effecting a great saving in time in the disassemblage and reassemblage of the removed parts.

I do not limit my invention to the structure shown and described as many modifications of my invention, within the scope of the appended claims, may be made without departing from the spirit of my invention.

What I claim is:—

1. In a cycle, the combination with a steering fork, two driving wheels respectively rotatable on the arms of said fork, two belts respectively engaging said driving wheels, a carrying wheel, and means rotatably mounting said carrying wheel on and between said fork arms, of two driven wheels fastened on and revoluble with said carrying wheel and respectively engaging said belts.

2. In a cycle, the combination with a steering fork, two driving wheels respectively rotatable on the arms of said fork, two belts respectively engaging said driving wheels, and a carrying wheel between said fork arms, of a stationary axle, on which said carrying wheel is revoluble, mounted removably on said fork arms, and two driven wheels fastened on and revoluble with said carrying wheel and respectively engaged by said belts.

3. In a cycle, the combination with a steering fork, two driving wheels respectively rotatable on the arms of said fork, and two belts respectively engaging said driving wheels, of a stationary axle mounted on said fork arms, a carrying wheel having a tubular hub and having ball bearings within said hub and mounted on said axle between said fork arms, and two driven wheels fastened on and revoluble with said hub and respectively engaged by said belts.

4. In a cycle, the combination with a steering fork, two driving wheels respectively rotatable on the arms of said fork, two belts respectively engaging said driving wheels, and a carrying wheel, of a stationary axle, on which said carrying wheel is revoluble, removably extending through said fork arms and at one end having means bearing against one of said fork arms and having its other end threaded and provided with a removable nut bearing against the other fork arm, and two driven wheels fastened on and revoluble with said carrying wheel and respectively engaged by said belts.

In testimony whereof I have signed my name to this specification.

GARFIELD A. ROBERDS.